United States Patent
Watanabe (10) Patent No.: US 10,539,814 B2
(45) Date of Patent: Jan. 21, 2020

(54) OPTICAL ISOLATOR AND SEMICONDUCTOR LASER MODULE

(71) Applicant: Shin-Etsu Chemical Co., Ltd., Tokyo (JP)

(72) Inventor: Toshiaki Watanabe, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 6 days.

(21) Appl. No.: 15/988,749

(22) Filed: May 24, 2018

(65) Prior Publication Data

US 2018/0356656 A1 Dec. 13, 2018

(30) Foreign Application Priority Data

Jun. 7, 2017 (JP) ................. 2017-112252

(51) Int. Cl.
| | | |
|---|---|---|
| *G02F 1/09* | (2006.01) | |
| *G02B 6/27* | (2006.01) | |
| *G02F 1/00* | (2006.01) | |
| *G02B 5/30* | (2006.01) | |
| *G02B 27/28* | (2006.01) | |

(52) U.S. Cl.
CPC .......... *G02F 1/093* (2013.01); *G02B 6/2746* (2013.01); *G02F 1/0036* (2013.01); *G02B 5/3083* (2013.01); *G02B 27/283* (2013.01)

(58) Field of Classification Search
CPC ...... G02F 1/0036; G02F 1/093; G02B 6/2746
USPC .............. 359/282, 484.02, 484.03; 372/703
See application file for complete search history.

(56) References Cited

U.S. PATENT DOCUMENTS

| | | | | |
|---|---|---|---|---|
| 4,756,607 A * | 7/1988 | Watanabe | ............... | G02F 1/093 359/282 |
| 5,066,092 A * | 11/1991 | Droegemueller | .... | G02B 6/4209 385/31 |
| 5,105,307 A * | 4/1992 | Nishiyama | ............. | G02F 1/093 359/484.03 |
| 5,278,853 A * | 1/1994 | Shirai | ................. | G02B 6/2746 372/37 |
| 5,345,329 A * | 9/1994 | Shirai | ..................... | G02F 1/093 359/282 |
| 5,381,261 A * | 1/1995 | Hirai | ....................... | G02F 1/093 359/282 |
| 5,408,491 A * | 4/1995 | Hirai | ....................... | G02F 1/093 359/484.03 |
| 5,566,259 A * | 10/1996 | Pan | ......................... | G02F 1/093 359/484.03 |

(Continued)

FOREIGN PATENT DOCUMENTS

JP 2004-233385 A 8/2004

*Primary Examiner* — Ricky D Shafer
(74) *Attorney, Agent, or Firm* — Birch, Stewart, Kolasch & Birch, LLP (57) ABSTRACT

A small, low-cost 1.5-stage optical isolator has, in a forward direction, incoming light and outgoing light polarization directions that are parallel. The isolator includes a first Faraday rotator, a first polarizer, a second Faraday rotator and a second polarizer arranged in order on a light transmission path, and a magnet arranged so as to apply a same-direction magnetic field to the first Faraday rotator and the second Faraday rotator. Faraday rotation in the first Faraday rotator and Faraday rotation in the second Faraday rotator occur in opposite directions.

5 Claims, 6 Drawing Sheets

(56) References Cited

U.S. PATENT DOCUMENTS

2003/0184751 A1* 10/2003 Saitoh ..................... G01J 4/00
356/369

* cited by examiner

OPTICAL ISOLATOR AND SEMICONDUCTOR LASER MODULE

CROSS-REFERENCE TO RELATED APPLICATION

This non-provisional application claims priority under 35 U.S.C. § 119(a) on Patent Application No. 2017-112252 filed in Japan on Jun. 7, 2017, the entire contents of which are hereby incorporated by reference.

TECHNICAL FIELD

This invention relates to an optical isolator, which is an optical component used in optical communications and optical measurement to keep reflected light from a fiber end or is lens end from returning to the laser serving as the light source. The invention further relates to a semiconductor laser module that uses such an optical isolator.

BACKGROUND ART

In optical communications and optical measurement, when light that has exited a semiconductor laser serving as the light source is reflected from the surfaces of members provided along the transmission path and returns to the semiconductor laser, laser oscillation becomes unstable. Optical isolators containing Faraday rotators that non-reciprocally rotate the light's plane of polarization are used to block such reflected returning light.

Recently, in the semiconductor laser modules utilized in optical communications, increasing use has been made of tunable laser light sources having a broad oscillation wavelength range. It is desired that the optical isolators used for tunable laser light sources exhibit a high isolation performance over a broad wavelength range.

When using a tunable laser light source, the method of increasing wavelength stability by placing the optical isolator on a temperature regulator (Peltier element) has hitherto been employed. However, to conserve power, temperature regulators are no longer used; moreover, the module interior is now often set to a high temperature. Hence, it is also desired that the optical isolators used in tunable laser light sources be suitable for a broad temperature range.

Figure 5:
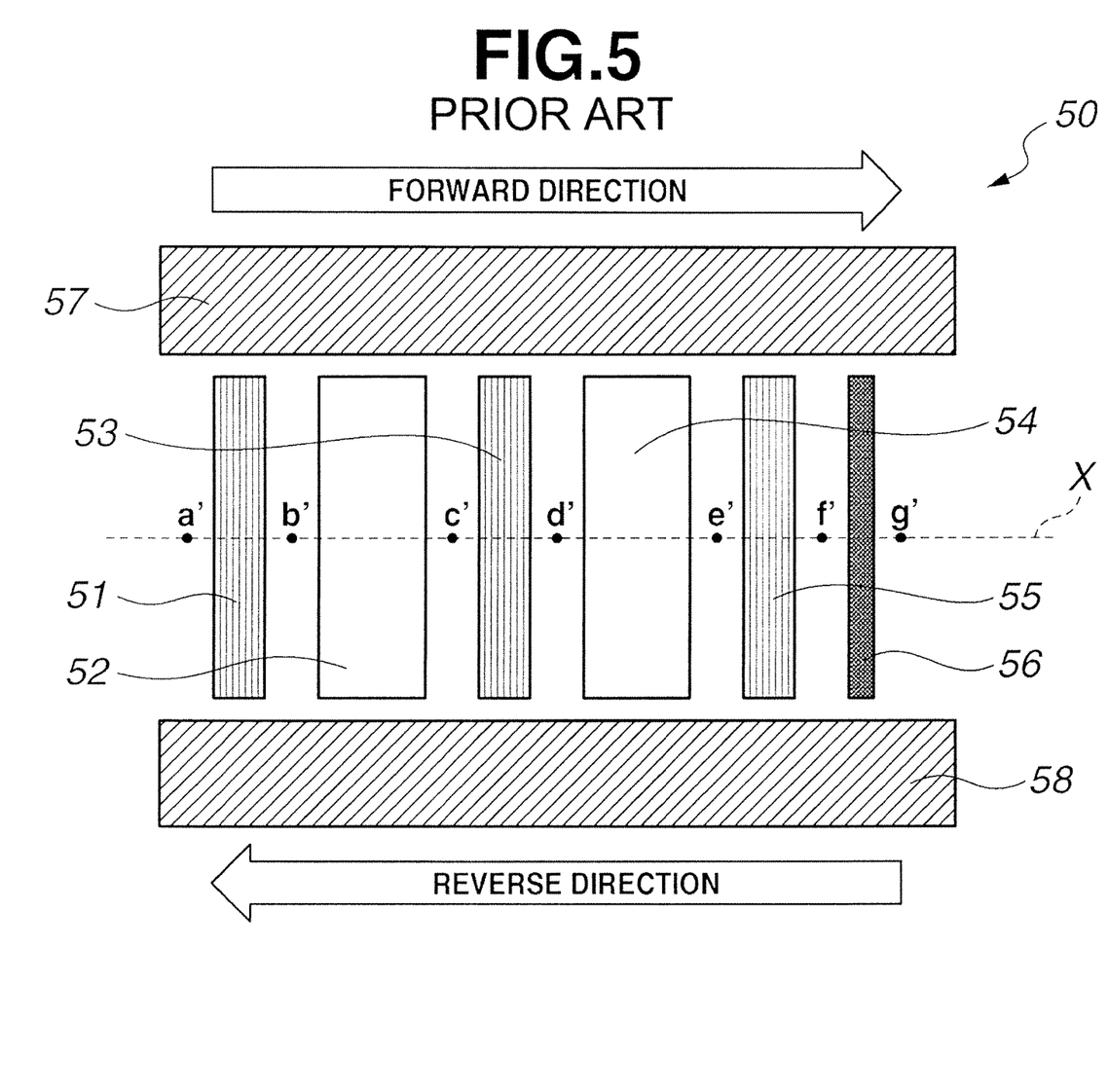
FIG. 5 is a schematic view of a conventional 1.5-stage optical isolator.
Figure 6A:
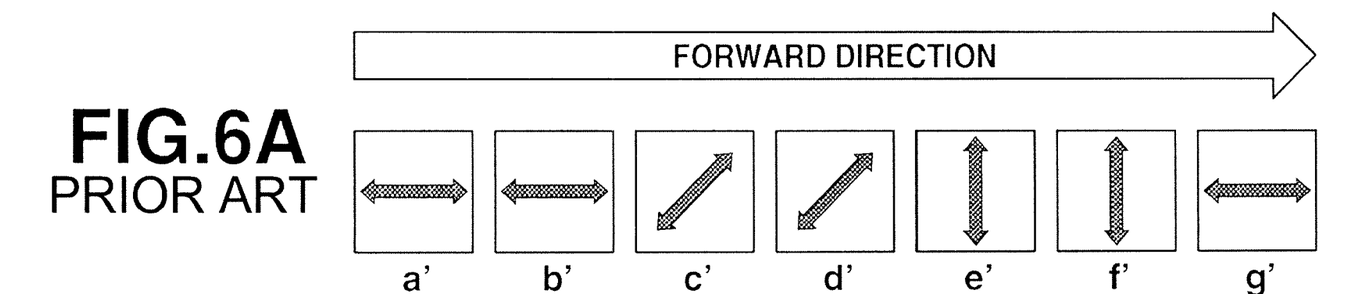
FIG. 6A and FIG. 6B are conceptual diagrams showing the polarization directions of light passing through the optical isolator in FIG. 5, FIG. 6A depicting the polarization of light traveling in the forward direction and FIG. 6B depicting the polarization of light traveling in the backward direction.
Figure 6B:
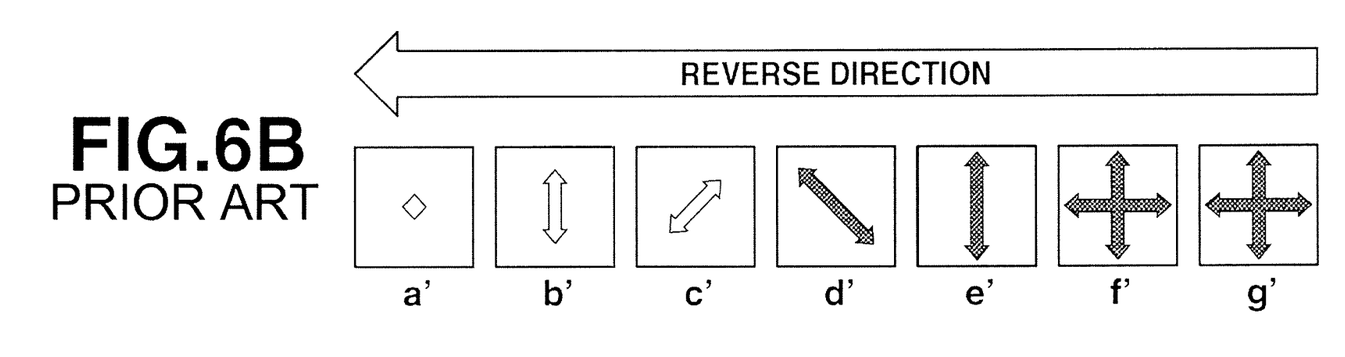

Given this desire, 1.5-stage optical isolators and two-stage optical isolators are generally used in modules that employ a tunable laser light source and in applications requiring a high reliability. Referring to FIG. 5, a 1.5-stage optical isolator is an optical isolator 50 having a first polarizer 51, a first Faraday rotator 52, a second polarizer 53, a second Faraday rotator 54, a third polarizer 55 and a half-wave plate 56 arranged in this order on a light transmission path (indicated by the symbol X in the diagram), and magnets 57 and 58 arranged on the periphery thereof. FIG. 6A and FIG. 6B show the direction of light polarization at each of a number of places a' to g' on the light transmission path in FIG. 5. The arrows at a' to g' in FIG. 6A and FIG. 6B indicates the direction of polarization as seen from the light input side.

In FIG. 6A and FIG. 6B, incoming light that is polarized in the vertical direction, in the course of passing through the first polarizer 51, the first Faraday rotator 52, the second is polarizer 53, the second Faraday rotator 54 and the third polarizer 55, becomes light polarized in the horizontal direction. The plane of polarization is then rotated 90° by a half-wave plate 56, whereupon the polarization directions for the input light and the output light become the same.

A semiconductor laser chip, an optical isolator and a waveguide-type modulator are often arranged in this order in a semiconductor laser module. Because the semiconductor laser chip has output polarization direction dependency and the wavelength-type modulator has input polarization direction dependency, the polarization direction of light entering the optical isolator positioned therebetween and the polarization direction of light leaving the isolator need to be made to agree.

Accordingly, it is desired that such a 1.5-stage optical isolator have a high isolation performance and also a smaller size and a lower cost, and so improved technology has been awaited.

To address this, JP-A 2004-233385 describes a repulsion-type 1.5-stage optical isolator in which two magnets are arranged with the polarities reversed and which does not use a half-wave plate. However, in this method, the two magnets repel one another, making assembly difficult and also making high reliability in fixing the magnets essential.

SUMMARY OF THE INVENTION

It is therefore an object of this invention to provide a small, low-cost, 1.5-stage optical isolator and a semiconductor laser module that uses such an optical isolator. As a result of extensive investigations, I have discovered the following concerning an optical isolator which, in a forward direction, has incoming light and outgoing light polarization directions that are parallel. That is, in such an optical isolator, when a first Faraday rotator, a first polarizer, a second Faraday rotator and a second polarizer are arranged in this order on the light transmission path and, moreover, a magnet is arranged so as to apply a magnetic field to the first Faraday rotator and second Faraday rotator in the same direction as the forward direction of light propagation through the isolator and this same-direction magnetic field is applied, by selecting and modifying the materials and the like of the first Faraday rotator and the second Faraday rotator such that the Faraday rotation directions for the first Faraday rotator and the second Faraday rotator are mutually opposed, two structural components of a conventional 1.5-stage optical isolator—i.e., one of the polarizers and the half-wave plate—are no longer needed, resulting in a smaller size, a lower cost and a high isolation performance over a broad wavelength range and temperature range.

Accordingly, in one aspect, the invention provides an optical isolator which, in a forward direction, has incoming light and outgoing light polarization directions that are parallel. The isolator includes a first Faraday rotator, a first polarizer, a second Faraday rotator and a second polarizer arranged in order on a light transmission path, and a magnet arranged so as to apply a same-direction magnetic field to the first Faraday rotator and the second Faraday rotator. Faraday rotation in the first Faraday rotator and Faraday rotation in the second Faraday rotator occur in opposite directions.

In a preferred embodiment of the optical isolator of the invention, the magnet is magnetized at both ends to different poles and situated at the periphery of the first Faraday rotator, the first polarizer, the second Faraday rotator and the second polarizer.

In another preferred embodiment, the first Faraday rotator, the first polarizer, the second Faraday rotator and the second polarizer are installed on a flat surface of a flat plate base and the second polarizer has a transmission polarization direction that is parallel to the flat installation surface of the base.

In yet another preferred embodiment, in the forward direction, the incident face of the first Faraday rotator is inclined with respect to the optical axis of the incoming light.

According to another aspect, the invention provides a semiconductor laser module which includes a semiconductor laser chip, the optical isolator of the first aspect of the invention and a waveform-type modulator.

Advantageous Effects of the Invention

The optical isolator of the invention has no need for two of the structural components used in conventional 1.5-stage isolators—one of the polarizers and the half-wave plate, and therefore is smaller and lower cost. Moreover, it exhibits a high isolation performance over a broad wavelength range and a broad temperature range.

BRIEF DESCRIPTION OF THE DIAGRAMS

DESCRIPTION OF THE PREFERRED EMBODIMENTS

The objects, features and advantages of the invention will become more apparent from the following detailed description of embodiments thereof taken in conjunction with the appended diagrams, although the invention is not limited to the embodiments set form below.

The optical isolator of the invention is a component which, in a forward direction, has incoming light and outgoing light polarization directions that are parallel. Such an optical isolator can be advantageously used in, for example, cases where it is disposed between a semiconductor laser chip having output polarization direction dependency and a wavelength-type modulator having input polarization direction dependency.

Figure 1:
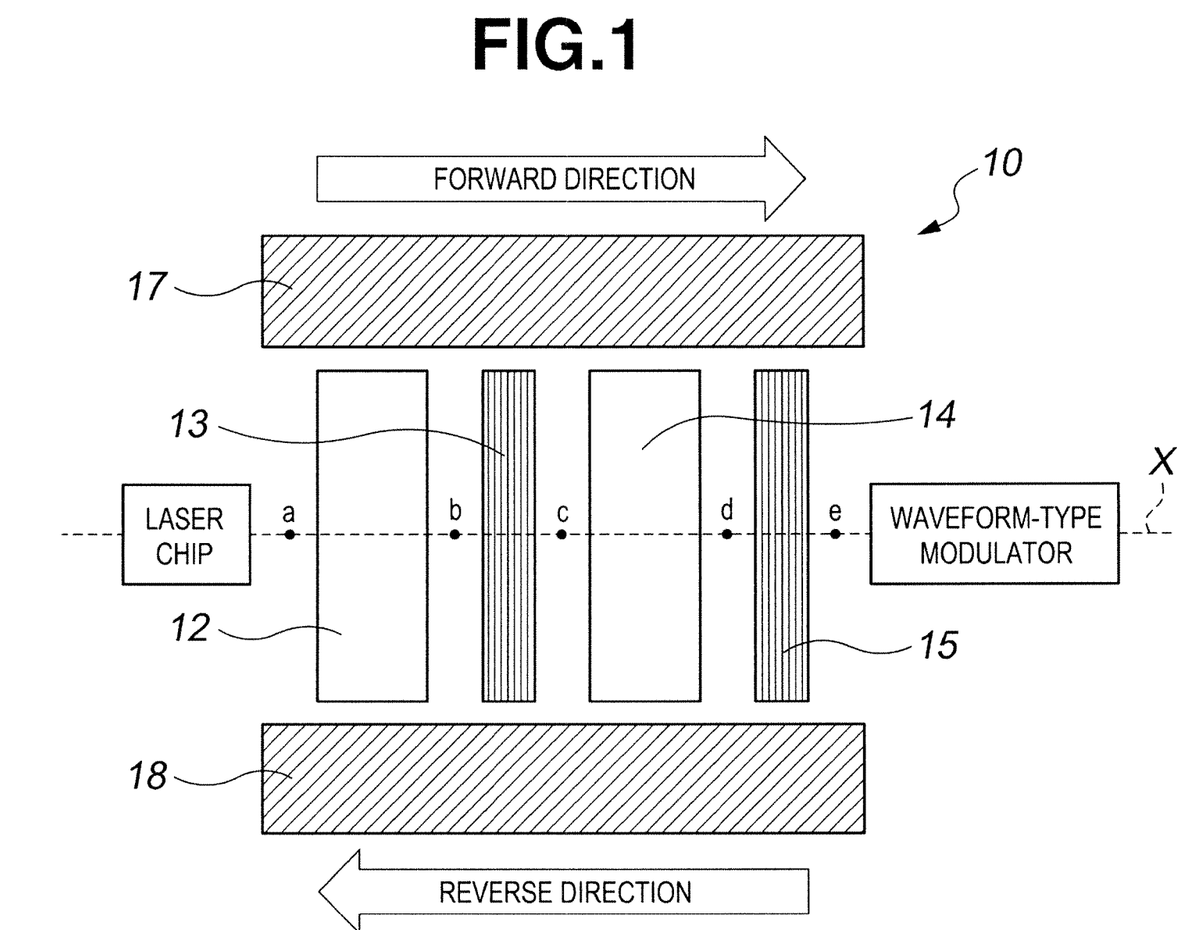
FIG. 1 is a schematic view of an optical isolator according to one embodiment of the invention.
Figure 2A:
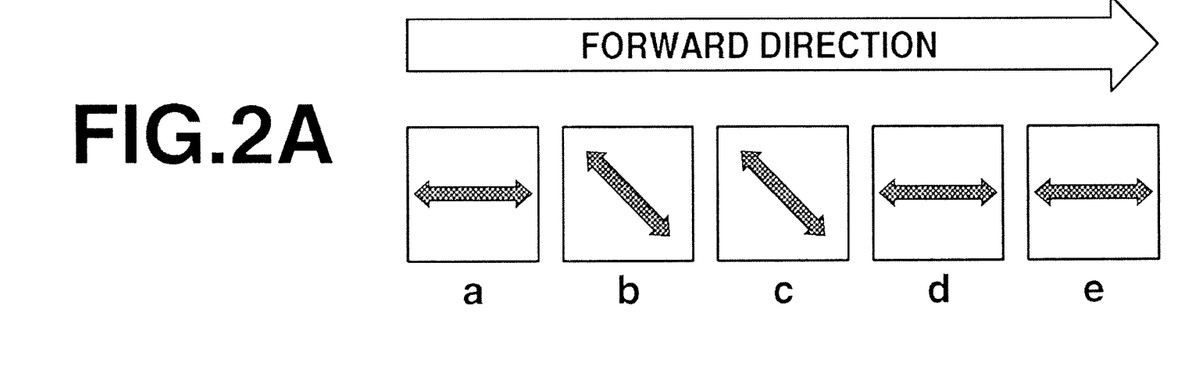
FIG. 2A and FIG. 2B are conceptual diagrams showing the polarization directions of light passing through the optical isolator in FIG. 1, FIG. 2A depicting the polarization of light traveling in the forward direction and FIG. 2B depicting the polarization of light traveling in the backward direction.
Figure 2B:
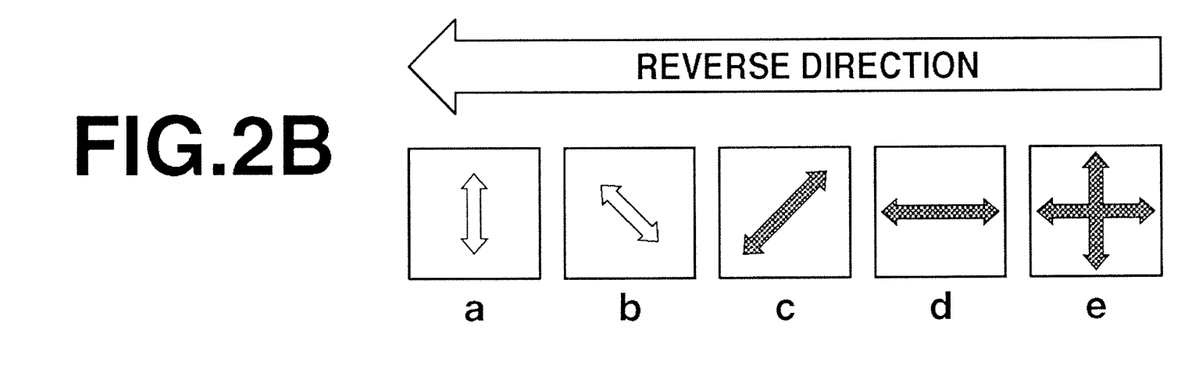

The structure of the inventive optical isolator is described while referring to FIGS. 1 and 2.

FIG. 1 is a schematic view showing an optical isolator according to the invention. Referring to FIG. 1, the optical isolator 10 has, arranged in order on a light transmission path (represented by the symbol X), a first Faraday rotator 12, a first polarizer 13, a second Faraday rotator 14 and a second polarizer 15. Also, magnets 17 and 18 are arranged so as to apply a same-direction magnetic field to the first Faraday rotator 12 and the second Faraday rotator 14, and Faraday rotation in the first Faraday rotator and Faraday rotation the second Faraday rotator occur in opposite directions. FIGS. 2A and 2B show the direction of polarization for light at various places a to e on the light transmission path in FIG. 1. The arrows in a to e of FIG. 2A and FIG. 2B indicate the polarization direction as seen from the light input side.

In this arrangement, as shown in FIG. 2A, the incoming light that is polarized in a specific direction (see the symbol a in the diagram) has a plane of polarization that is rotated 45° by the first Faraday rotator 12 (b in the diagram). The light whose plane of polarization has been rotated by the first Faraday rotator 12 then passes through the first polarizer (c in the diagram). Next, the plane of polarization is rotated 45° by the second Faraday rotator 14 in the opposite direction to the direction of Faraday rotation by the first Faraday rotator 12 (d in the diagram). The light whose plane of polarization has been rotated by the second Faraday rotator 14 then passes through the second polarizer 15 (e in the diagram) and exits the optical isolator. At this time, the direction of polarization of the outgoing light is parallel to the direction of polarization of the incoming light.

Next, referring to FIG. 2B, which depicts returning light traveling in the reverse direction, first, only returning light that is polarized in a specific direction by the second polarizer 15 is transmitted (d in the diagram). Next, the second Faraday rotator 14 rotates the plane of polarization in a direction different from the plane of polarization that would allow light to pass through the first polarizer 13 (c in the diagram). Hence, the returning light cannot pass through the first polarizer 13 and is blocked (b in the diagram).

Even in a case where there is returning light that can pass through the first polarizer 13, the plane of polarization is rotated by the first Faraday rotator 12, becoming perpendicular to the direction of polarization of the incoming light (a in the diagram).

Semiconductor laser chips are readily affected by returning light polarized in the same direction as the direction of polarization of the outgoing laser light, but are little affected by returning light polarized in an orthogonal direction. Hence, the optical isolator of the invention can be advantageously used together with a semiconductor laser chip.

Compared with the conventional 1.5-stage optical isolator shown in FIG. 5, the optical isolator of the invention does not use certain structural components—namely, one of the polarizers and the half-wave plate. Hence, it can be fabricated at low cost and also can be made smaller.

In the optical isolator of the invention, when a same-direction magnetic field is applied, Faraday rotation in the first Faraday rotator and Faraday rotation in the second Faraday rotator occur in opposite directions. Therefore, mutually differing materials are used in the first Faraday rotator and in the second Faraday rotator. For example, $(GdBi)_3(FeGa)_5O_{12}$ may be used as the first Faraday rotator material, and $(TbEuBi)_3(FeGa)_5O_{12}$ may be used as the second Faraday rotator material. Alternatively, the above materials for the first Faraday rotator and the second Faraday rotator may be reversed.

The Faraday rotator materials are not particularly limited, so long as they are materials that exhibit the Faraday effect. In addition to those mentioned above, other examples include yttrium iron garnet $(Y_3Fe_5O_{12})$, Faraday rotation glass and terbium gallium garnet $(Tb_3Ga_5O_{12})$. These may be single crystals or may be polycrystalline. Also, in order to be able to shorten the Faraday rotator, it is preferable to use as the Faraday rotator material a material which has a large Faraday rotation coefficient or Verdet constant in the wavelength range to be employed. Furthermore, in order to be suitable for a broad wavelength range or temperature range, it is preferable to use a material in which the wavelength dependence and temperature dependence of the Faraday rotation coefficient or the Verdet constant is small.

The angle of rotation (optical rotation) of a Faraday rotator can be determined by the Faraday rotation coefficient or Verdet constant of the Faraday rotator, the length of the Faraday rotator, and the strength of the magnetic field. In the first Faraday rotator and the second Faraday rotator, the isolation performance is highest when the Faraday rotation angle is 45°. When the wavelength and temperature to be used are constant, the length of the Faraday rotator and the strength of the magnetic field should be set in such a way that the angle of rotation in Faraday rotation becomes 45°. In cases where a tunable laser light source is used or the temperature varies, it is preferable to design the optical isolator such that the isolation performance is stable and high over the entire wavelength range or temperature range to be used.

The first polarizer and second polarizer used in the invention are not particularly limited as to the type of polarizer; mutually differing types of polarizers may be used as the first polarizer and the second polarizer, or identical polarizers may be used. The types of polarizers that may be used in the optical isolator include, for example, prism-type polarizers made using a polarizing glass, a polarizing beam splitter (PBS) or a birefringent crystal, and wire grid-type polarizers. Of these, polarizing glass is preferred because the optical path length can be shortened.

As mentioned above, the first polarizer is installed in such a way that light whose plane of polarization has been rotated by the first Faraday rotator passes through. The second polarizer is installed in such a way that light whose plane of polarization has been rotated by the second Faraday rotator passes through. The angle of Faraday rotation varies with the wavelength or temperature used, and so it suffices here for some polarized component to pass through. The transmission polarization directions of the first polarizer and the second polarizer are preferably set so as to differ by 45° relative to one another.

The type of magnet used in the invention is not particularly limited. For example, samarium-cobalt (SmCo) magnets, Nd—Fe—B magnets, and injection-molded magnets may be used. Of these, SmCo magnets are preferred because they have high Curie temperatures and are resistant to corrosion. There are no limitations on the magnet shape.

As described above, the magnet is arranged so as to apply a same-direction magnet field to the first Faraday rotator and the second Faraday rotator. The magnet used in the invention may be a single magnet or a plurality of magnets. The magnetic field may be applied to the first Faraday rotator and the second Faraday rotator by the same magnet or by separate magnets.

The magnet is preferably magnetized at both ends to different poles and situated at the periphery of the first Faraday rotator, the first polarizer, the second Faraday rotator and the second polarizer. For example, the first Faraday rotator, the first polarizer, the second Faraday rotator and the second polarizer may be arranged at the interior of a cylindrical magnet, or a plurality of rod-shaped or flat plate-like magnets may be arranged at the periphery of the first Faraday rotator, the first polarizer, the second Faraday rotator and the second polarizer.

Figure 3:
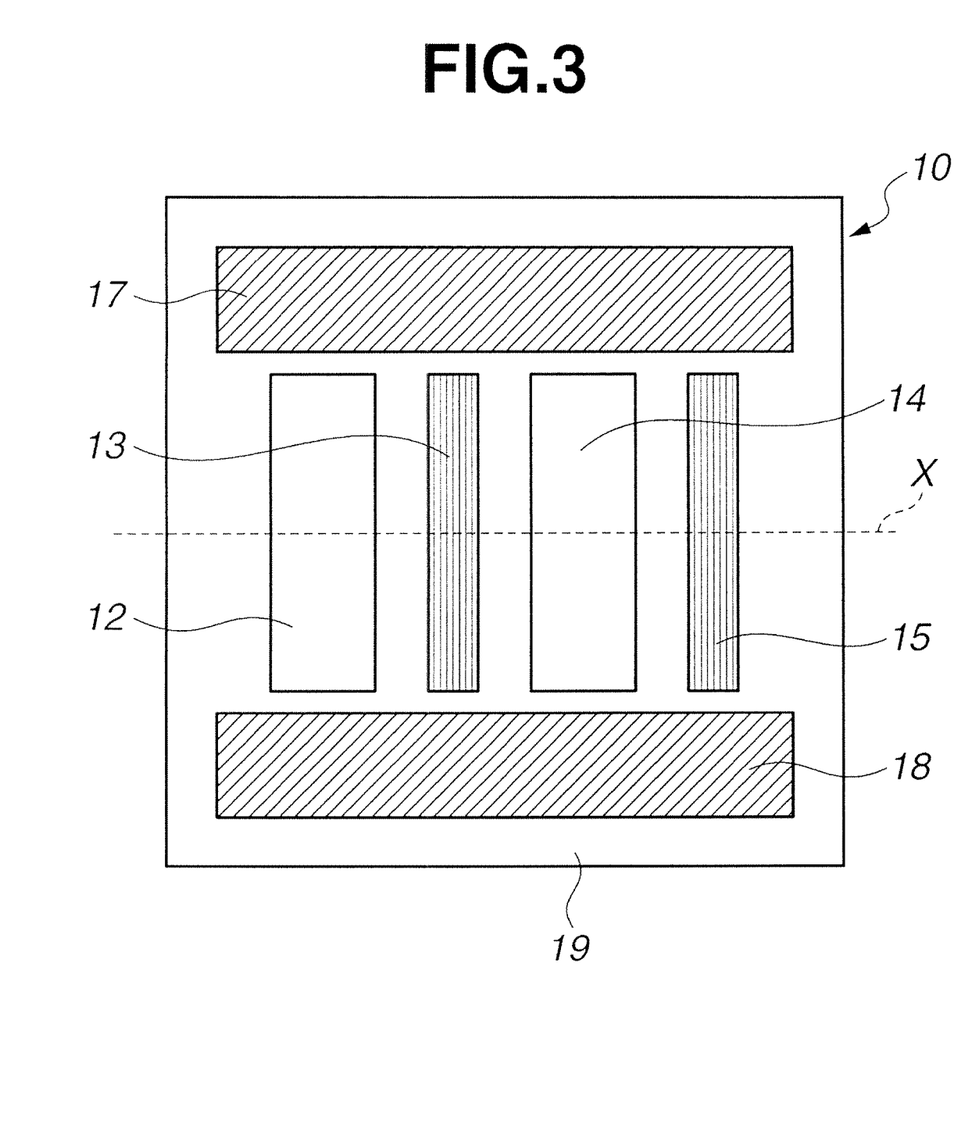
FIG. 3 is a schematic top view of an optical isolator according to another embodiment of the invention.
Figure 4:
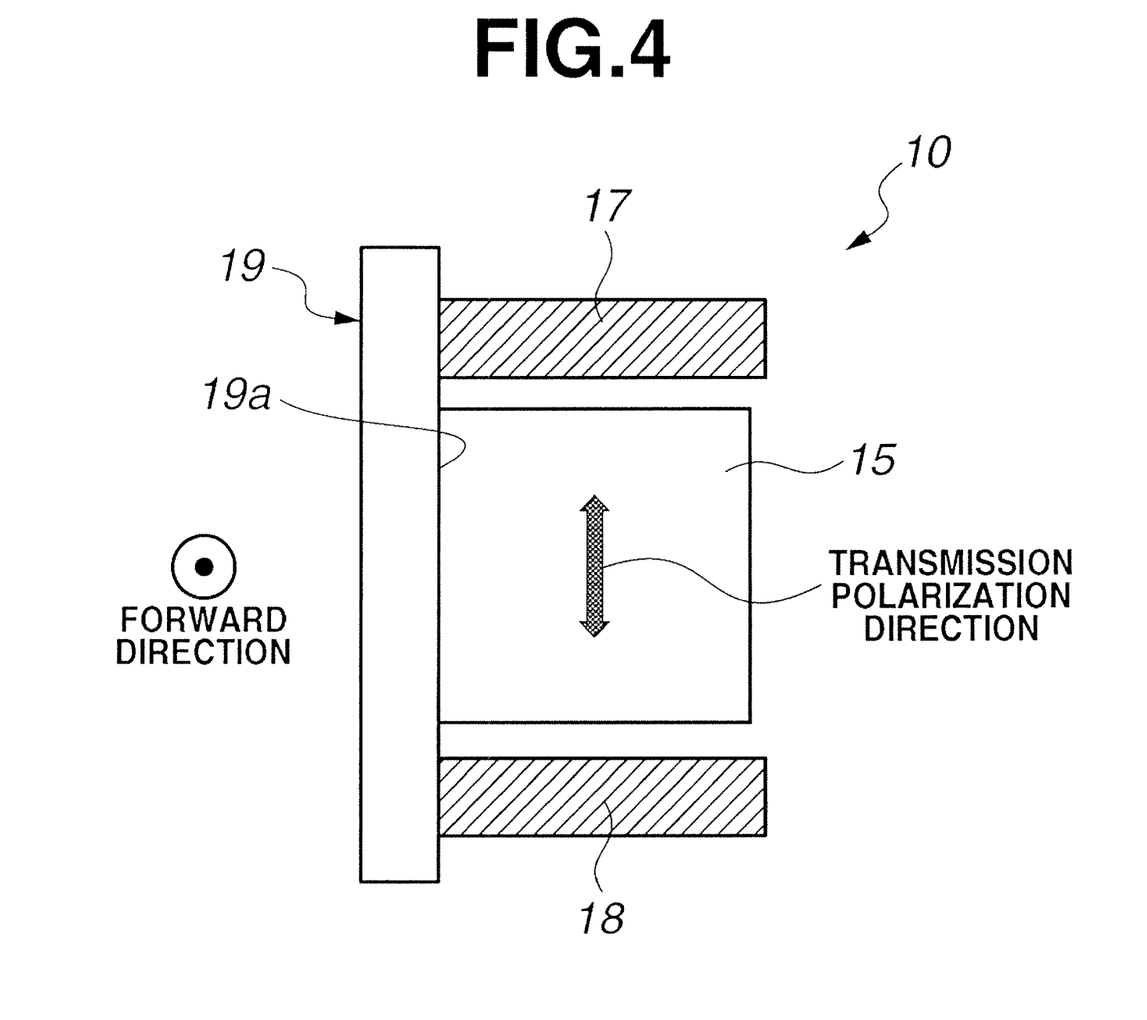
FIG. 4 is a schematic front view of the optical isolator in FIG. 3

The first Faraday rotator, first polarizer, second Faraday rotator and second polarizer may be installed on a flat surface of a flat plate base. For example, in the optical isolator 10 shown in FIG. 3, the first Faraday rotator 12, the first polarizer 13, the second Faraday rotator 14 and the second polarizer 15 are installed on a flat surface of a flat plate base 19. This is preferable because, when the optical isolator is installed in a semiconductor laser module, deterioration in the device characteristics due to bonding strain can be prevented. Also, referring to FIG. 4, it is preferable for the transmission polarization direction of the second polarizer to be parallel to the flat installation surface 19a of the base 19. This facilitates incorporation of the optical isolator when used together with, for example, a waveguide-type modulator having input polarization direction dependency.

In this invention, it is preferable for the incident face of the first Faraday rotator to be inclined with respect to the optical axis of the incoming light. This is advantageous in that the influence of residual reflection in an anti-reflective coating for air formed on the surface of the first Faraday rotator can be reduced. As used herein, an "anti-reflective coating for air" refers to an anti-reflective coating that is applied to an optical element such as a Faraday rotator or a polarizer and is designed to minimize reflection in air, and an "anti-reflective coating for adhesive" is an anti-reflective coating that is applied to an optical element and is designed to minimize reflection at an adhesive bonding the optical element with another optical element.

The optical isolator of the invention may be integrated together with a semiconductor laser chip and a waveform-type modulator and used as a semiconductor laser module. In this semiconductor laser module, it is preferable for the semiconductor laser chip, the optical isolator and the waveform modulator to be arranged in this order.

EXAMPLES

The following Working Example and Comparative Example are provided to illustrate the invention, but are not intended to limit the scope thereof.

Working Example 1

A $(GdBi)_3(FeGa)_5O_{12}$ crystal was selected as the first Faraday rotator and a $(TbEuBi)_3(FeGa)_5O_{12}$ crystal was selected as the second Faraday rotator. When a same-direction magnetic field is applied to these materials, their Faraday rotations occur in opposite directions. Also, polarizing glass (Polarcor™, from Corning) was used as the first polarizer and the second polarizer.

A 11.0 mm×11.0 mm $(GdBi)_3(FeGa)_5O_{12}$ crystal was prepared as the first Faraday rotator, and an anti-reflective (AR) coating for air was provided on one side and an AR coating for adhesive was provided on the other side. The first polarizer was attached with an adhesive to the side of the $(GdBi)_3(FeGa)_5O_{12}$ crystal to which the AR coating for adhesive had been applied. The size of the first polarizer was 11.0 mm×11.0 mm×0.2 mm, and both sides had an AR coating for adhesive applied thereto. In addition, a 11.0 mm×11.0 mm $(TbEuBi)_3(FeGa)_5O_{12}$ crystal as the second Faraday rotator was attached with an adhesive to the first polarizer. This crystal had an AR coating for adhesive provided on both sides.

In a separate operation, a 11.0 mm×11.0 mm×0.2 mm second polarizer provided on one side with an AR coating for air and on the other side with an AR coating for adhesive was prepared. The side of this second polarizer on which an AR coating for adhesive had been provided was attached with an adhesive to the second Faraday rotator.

The assembly obtained by bonding together the first Faraday rotator, the first polarizer, the second Faraday rotator and the second polarizer was cut to a size of 1.0 mm×1.0 mm, thereby producing optical elements. An optical element thus fabricated was placed on the flat surface of a flat plate base, and two rod-shaped SmCo magnets were disposed at the periphery of the optical element in such a way as to apply a same-direction magnetic field to the first Faraday rotator and the second Faraday rotator, thereby producing an optical isolator.

Here, the length of the Faraday rotators and the strength of the magnetic field are set in such a way that the angle of Faraday rotation at the first Faraday rotator and the second Faraday rotator becomes 45° at a temperature of 25° C. and a wavelength of 1550 nm. The transmission polarization directions of the first polarizer and the second polarizer mutually differ by 45°.

The fabricated optical isolator had an insertion loss in the forward direction of 0.25 dB. To evaluate the isolation, light polarized in the same direction as the transmission polarization direction of the second polarizer was input from the reverse direction. To confirm the polarization state of the light after passing through the first Faraday rotator, a polarizing plate was rotated and the transmitted light was measured. As a result, the horizontal (the direction perpendicular to the arrow shown in a of FIG. 2B) component of the transmitted light was −55 dB, and the vertical (same direction as arrow shown in a of FIG. 2B) component was −48 dB.

The optical isolator of Working Example 1 has an isolation performance comparable to that of a conventional 1.5-stage optical isolator (Comparative Example 1), yet can be shortened by about 0.3 mm (polarizer, 0.2 mm; half-wave plate, about 0.1 mm) in the direction of the optical axis. Moreover, the cost of one polarizer and one half-wave plate can be eliminated.

Comparative Example 1

(TbEuBi)$_3$(FeGa)$_5$O$_{12}$ crystals were selected as the Faraday rotators. Polarizing glass (Polarcor™, from Corning) was used as the polarizers.

A first polarizer having dimensions of 11.0 mm×11.0 mm×0.2 mm and provided on one side with an AR coating for air and on the other side with an AR coating for adhesive was prepared. Next, a 11.0 mm×11.0 mm (TbEuBi)$_3$(FeGa)$_5$O$_{12}$ crystal as the first Faraday rotator was attached with an adhesive to the side of the first polarizer provided with the AR coating for adhesive. Both sides of this crystal are provided with an AR coating for adhesive.

A second polarizer having dimensions of 11.0 mm×11.0 mm×0.2 mm was attached with an adhesive to the first Faraday rotator. The second polarizer was provided on both sides with an AR coating for adhesive. In addition, as the second Faraday rotator, a (TbEuBi)$_3$(FeGa)$_5$O$_{12}$ crystal having dimensions of 11.0 mm×11.0 mm was attached with an adhesive to the second polarizer. This crystal was provided on both sides with an AR coating for adhesive.

A third polarizer having dimensions of 11.0 mm×11.0 mm×0.2 mm was attached with an adhesive to the second Faraday rotator. The third polarizer was provided on both sides with an AR coating for adhesive.

In a separate operation, a 11.0 mm×11.0 mm×0.09 mm quartz half-wave plate provided on one side with an AR coating for air and on the other side with an AR coating for adhesive was prepared. The side of this quartz half-wave plate on which the AR coating for adhesive had been provided was attached with an adhesive to the third polarizer.

The assembly obtained by bonding together the first polarizer, the first Faraday rotator, the second polarizer, the second Faraday rotator, the third polarizer and the half-wave plate was cut to a size of 1.0 mm×1.0 mm, thereby producing optical elements. Two rod-shaped SmCo magnets were disposed at the periphery of the optical element in such a way as to apply a same-direction magnetic field to the first Faraday rotator and the second Faraday rotator, thereby producing an optical isolator.

Here, the length of the Faraday rotators and the strength of the magnetic field are set in such a way that the angle of Faraday rotation at the first Faraday rotator and the second Faraday rotator becomes 45° at a temperature of 25° C. and a wavelength of 1550 nm.

The resulting optical isolator had an insertion loss in the forward direction of 0.28 dB. To evaluate the isolation, light polarized in the same direction as the transmission polarization direction of the second polarizer was input from the reverse direction. The transmitted light was measured and found to be −54.5 dB.

Japanese Patent Application No. 2017-112252 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An optical isolator which, in a forward direction, has incoming light and outgoing light polarization directions that are parallel, comprising a first Faraday rotator, a first polarizer, a second Faraday rotator and a second polarizer arranged in order on a light transmission path, and a magnet arranged so as to apply a same-direction magnetic field to the first Faraday rotator and the second Faraday rotator,
    wherein Faraday rotation in the first Faraday rotator and Faraday rotation in the second Faraday rotator occur in opposite directions.

2. The optical isolator of claim 1, wherein the magnet is magnetized at both ends to different poles and situated at the periphery of the first Faraday rotator, the first polarizer, the second Faraday rotator and the second polarizer.

3. The optical isolator of claim 1 or 2, wherein the first Faraday rotator, the first polarizer, the second Faraday rotator and the second polarizer are installed on a flat surface of a flat plate base and the second polarizer has a transmission polarization direction that is parallel to the flat installation surface of the base.

4. The optical isolator of claim 1 wherein, in the forward direction, the incident face of the first Faraday rotator is inclined with respect to the optical axis of the incoming light.

5. A semiconductor laser module comprising a semiconductor laser chip, the optical isolator of claim 1 and a waveform-type modulator.

* * * * *